March 1, 1960   W. I. WORKMAN   2,926,939
CLOSURE DEVICE
Filed March 13, 1958

United States Patent Office 2,926,939
Patented Mar. 1, 1960

2,926,939

CLOSURE DEVICE

Woodrow I. Workman, Hill, N.H., assignor to International Packings Corporation, Bristol, N.H., a corporation of Massachusetts Application March 13, 1958, Serial No. 721,126

7 Claims. (Cl. 286—5)

This invention relates to a closure device adapted to be positioned between a pair of relatively rotatable members and more particularly to a lubricant retaining device especially adapted for use with anti-friction bearings.

An annular or other chamber, such as is formed between two relatively rotatable members, for the purpose of containing lubricant is common in many mechanical structures. Such a chamber may be formed, for example, between the races of an anti-friction bearing or between a shaft and its associated housing. A seal is commonly provided for sealing such a chamber both to prevent leakage of lubricant from the chamber and also so that dirt and other contaminants cannot enter the chamber since either condition impairs the qualities of the lubricant and thus the operation of the rotating members. Ideally, such a seal should completely inhibit the passage of either lubricant or contaminants and therefor a seal which is of a permanent nature is preferably employed. The use of such a seal, however, necessarily dictates that the lubricant within the chamber cannot be replaced or replenished without permanently damaging the seal. This is a disadvantage in many instances wherein the lubricant is of such a nature that it must be replenished by introducing an additional amount to the chamber from time to time.

It is the principal object of the present invention to provide an improved closure device or seal adapted for mounting across an annular or other opening at one side of a lubricant containing chamber to permanently seal such opening and at the same time provide a seal which permits the addition of lubricants to the chamber as required, yet without impairing the effectiveness of the seal.

According to the invention, the closure device or seal includes a reinforcing disk about which rubber or a similar resilient material of appropriate sealing qualities is bonded so that the disk has a layer of such rubber preferably on each side thereof.

Such closure device or seal is adapted to be secured in an appropriate recess in the wall of the chamber it is intended to seal and is preferably provided with a lip of resilient material extending radially of the disk adapted to engage the wall of the chamber such that a sealing relationship, permanent in nature, is established. The term "permanent" as used herein denotes a device intended to remain in position for the length of its useful life.

In the preferred embodiment, the disk itself is formed with one or more funnel-shaped projections providing apertures therethrough with the walls of such projections extending outwardly for a substantial distance from the surface of the disk itself to define a generally circular opening in a plane parallel to and above the disk surface. These projections are positioned within the layer of rubber bonded to the disk and are entirely filled with such rubber, so that a solid funnel-shaped volume composed only of rubber is thereby defined. Furthermore, the annular surfaces at the outermost end of the projection defining the apertures through the disk are positioned flush with the outer surface of the rubber material to provide a clear indicia of the location of said apertures.

By virtue of the novel construction of the composite seal of the invention, the chamber which is sealed thereby may be lubricated without the removal of the seal simply by inserting through the rubber filled aperture in the reinforcing disk, the position of which is indicated by the annular metallic edges of the disk projection appearing on the face of the resilient material bonded to the disk, a conventional hypodermic needle of relatively small diameter. Upon withdrawal of the needle after the injection of lubricant, the resilient material within the projection, because of its funnel-shaped configuration bonded to the interior surface of the projection, resumes substantially its previous shape to close the temporary opening produced by the hypodermic needle so that the sealing qualities of the closure device are not impaired.

Other objects and advantages of the invention will be understood from the following description of a preferred embodiment of the invention in conjunction with the drawing in which.

Figure 1:
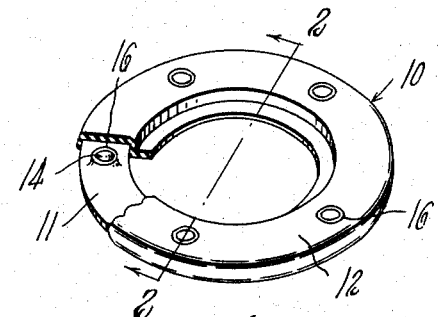
Fig. 1 is a perspective view of the preferred embodiment of the invention with a portion thereof broken away to illustrate a disk projection before the resilient material is applied to the disk.
Figure 2:
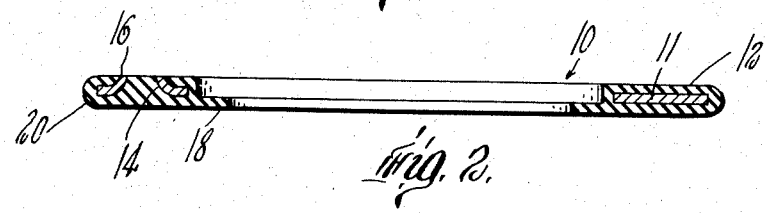
Fig. 2 is a sectional view of the preferred embodiment taken along the lines 2—2 of Fig. 1.

With reference to Figs. 1 and 2, the preferred embodiment of the present invention includes an annular metallic reinforcing disk 11 about which an annular resilient washer 12 of rubber is bonded. The reinforcing disk has a plurality of funnel-shaped projections 14 spaced along its surface. These projections are formed with upstanding walls 16 such that the upper surface of the projection wall is positioned above the surface of the disk a distance equal to the thickness of the rubber on top of the disk. In this manner the position of the projection in the reinforcing disk is indicated due to the positioning of the upper surface of the annular projection wall 16 flush with the surface of the bonded material. In the preferred embodiment the projection walls are extruded and ground off such that they extend .010 inch above the surface of the disk. The apertures are filled with the resilient material during the molding and bonding operation, as shown in Fig. 2, such that an impervious sealing structure is provided.

The closure device 10 includes resilient annular lip 18 adapted to engage one of the walls and an annular surface 20 opposite said lip is adapted to be secured, by press fit or otherwise, to the opposite wall such that the seal is positioned across a chamber in permanent fashion. The material utilized to form the washer is preferably a rubber-like material, such as synthetic rubber, which may be easily formed in a mold and vulcanized to the desired resiliency. The selected material should be resistant to damage from bearing lubrication materials and be of a quality such that it will maintain its resiliency under a variety of operating temperatures and environments. The reinforcing disk 11 is preferably metal and of a substantial nature such that adequate reinforcement is provided to assure the desired sealing qualities.

Figure 3:
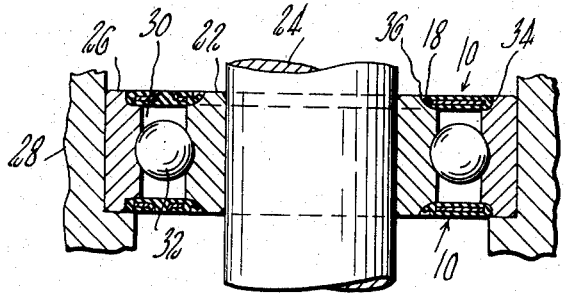
Fig. 3 is a sectional view of the closure device according to the preferred embodiment positioned in operative relationship with an anti-friction bearing.

The two closure devices shown in Fig. 3 seal the lubricant chamber of an anti-friction bearing. The inner race 22 of the bearing is positioned on a shaft 24 and the outer race 26 is positioned in an appropriate housing 28. The closure devices are secured on either side of the lubricant chamber 30 which contains the ball bearings 32. The outer wall 20 of each seal is seated against the outer race 26 in a shoulder portion 34 thereof and the lip 18 of each seal is resiliently deformed into lightly wiping relationship with the transversely curved annular wall 36 of the inner race 22. The lubricant chamber 30 is thus sealed such that lubricant is secured therein and contaminants cannot enter.

Figure 4:
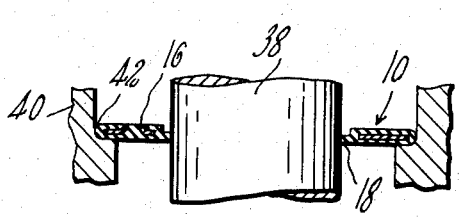
Fig. 4 is a sectional view of the closure device positioned in operative relationship across an annular space between a shaft and its housing.

The preferred embodiment of the closure device is shown in Fig. 4 positioned across a lubricant chamber between a shaft 38 and its associated housing 40. The outer wall 20 of the closure device is secured in a recess 42 in the housing and the lip 18 engages the shaft 38 in sealing relationship.

The principles of the invention may, of course, be embodied in other types of closure devices. For example, the position of the lip 18 and the wall 20 may be reversed. Also the principles of the invention may be utilized in closure devices in which the configuration of the reinforcing disk takes various other forms.

Figure 5:
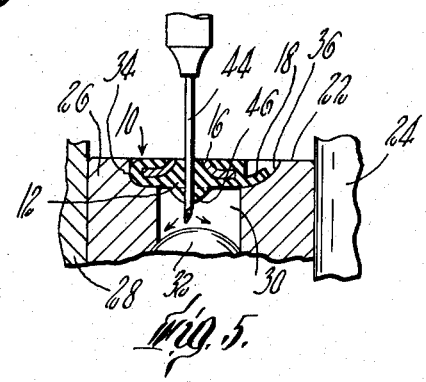
Fig. 5 is a sectional view of the preferred embodiment in the invention mounted in an anti-friction bearing, illustrating the method of supplying additional lubricant to the sealed chamber.

The lubricant chamber 30 may be supplied with additional lubrication after the bearing has been in use in the manner shown in Fig. 5. A hypodermic needle 44, filled with a lubricating medium of the appropriate viscosity is inserted into the lubricant chamber 30 through an aperture in the disk as indicated by one of projection walls 16 which are flush with the surfaces of the molded material. This insertion of the needle deforms the rubber substantially as indicated in Fig. 5, into a stressed condition. The desired quantity of lubricant is injected into the chamber and then the needle is withdrawn. Upon withdrawal of the needle the stressed resilient material of the washer 12 returns to substantially its initial condition such that the pin hole created by the passage of the needle therethrough is completely closed and lubricant cannot pass outwardly nor can contaminants enter. This occurs because of the bonding of the resilient material to the inner walls of the funnel-shaped projection 14. Since the resilient material is substantially incompressible, the insertion of hypodermic needle 44 displaces the resilient material downward (Fig. 5) to form a displaced mass or hump 46 around said needle. This distorts the resilient material out of its otherwise flat surface, as indicated by dotted lines in Fig. 5 with the simultaneous creation of restoring forces, due to resilient nature of the material and its bonding to the adjacent disk over the substantial surface area provided within the projection 14. It is these restoring forces, acting through the funnel-shaped mass of resilient material within the projection 14 that provide the essential complete closure upon removal of the needle, for the first time making possible a permanent seal which can readily be relubricated.

Thus, it is seen that the invention provides a closure device structure having the sealing characteristics of a permanent type seal but which permits relubrication of the sealed chamber without destruction of the seal. As such relubrication of the chamber is possible it no longer is necessary, in a sealed type of bearing, to reduce the quality of the lubricating medium in order to achieve adequate durability. A lubricant chamber, sealed with this apparatus according to this invention can be simply and easily relubricated without destroying the closure devices or impairing the effectiveness thereof.

It will be understood that while there has been shown and described herein a preferred embodiment, the invention is not intended to be limited thereby or to all details thereof, and departures may be made therefrom within the spirit and scope of the invention as set forth in the appended claims.

I claim:

1. In an assembly including a pair of relatively rotatable spaced members having seal engaging walls and defining an annular space therebetween, a sealing device comprising an annular resilient washer having an annular lip engaging one of said walls and an annular surface engaging the other wall in at least a press fit and a reinforcing disk in embedded relationship to said washer, said disk having an apertured projection therein the upper surface of said projection being flush with the surface of said washer so that said upper surface is visible and indicates the position of said apertured projection, said projection being filled with resilient material whereby a hypodermic needle may be inserted therethrough for lubricating purposes and upon withdrawal of said needle the perforation formed by the needle is closed such that the sealing qualities of the closure device are unimpaired.

2. A closure device for positioning across an annular area defined by a pair of relatively rotatable spaced members having seal engaging walls to provide a lubricant retaining chamber, comprising a reinforcing disk having an aperture therein and a resilient sealing material molding to said reinforcing disk, said device having a resilient annular lip adapted to engage one of said walls and an annular surface opposite said lip adapted to engage the other wall in sealing relationship, said aperture being defined by a projection integral with and upstanding from the surface of said reinforcing disk, said projection having an upper circular wall surface flush with the surface of said resilient sealing material whereby the location of said aperture is clearly indicated, said aperture being filled with a mass of said resilient material so that a hypodermic needle may be inserted into said chamber through said mass to inject a lubricating medium therein and upon the withdrawal of said hypodermic needle, said mass of resilient material reseals the aperture such that the sealing qualities of said closure device are unimpaired.

3. The closure device as claimed in claim 2 wherein said projection has a funnel-shaped bore and said resilient material is bonded to and fills said bore.

4. The closure device as claimed in claim 3 wherein said reinforcing disk is a flat metallic plate and a plurality of said projections are spaced thereon.

5. A closure device as claimed in claim 3 wherein said mass of resilient material is generally conical with its smaller end at said upper circular wall.

6. A closure device as claimed in claim 5 wherein said resilient material is rubber.

7. A closure device as claimed in claim 1 wherein the inner wall of said projection defines a funnel-shaped aperture and said resilient material fills said aperture to provide a generally conical mass.

References Cited in the file of this patent

FOREIGN PATENTS

| 622,418 | Great Britain | May 2, 1949 |
| 1,130,683 | France | Oct. 1, 1956 |